United States Patent
Hwang et al.

(10) Patent No.: US 7,796,202 B2
(45) Date of Patent: Sep. 14, 2010

(54) LIQUID CRYSTAL DISPLAY AND FABRICATING METHOD THEREOF

(75) Inventors: Seong Soo Hwang, Gumi-si (KR); Bung Goo Kim, Gumi-si (KR); Sang Ky Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 812 days.

(21) Appl. No.: 11/638,402

(22) Filed: Dec. 14, 2006

(65) Prior Publication Data

US 2007/0273801 A1    Nov. 29, 2007

(30) Foreign Application Priority Data

May 25, 2006    (KR)    ............... 10-2006-0047068

(51) Int. Cl.
*G02F 1/1333*    (2006.01)
*G02F 1/13*    (2006.01)

(52) U.S. Cl. .................... 349/40; 349/54; 349/192

(58) Field of Classification Search ............ 349/40, 349/54, 192

See application file for complete search history.

(56) References Cited

U.S. PATENT DOCUMENTS

| 5,909,035 | A  | * | 6/1999  | Kim ........................ 257/59 |
| 6,654,074 | B1 | * | 11/2003 | Ha et al. .................. 349/40 |
| 6,791,632 | B2 | * | 9/2004  | Lee et al. ................. 349/40 |
| 7,532,265 | B2 | * | 5/2009  | Tsai et al. ................ 349/40 |
| 2001/0030716 | A1 | * | 10/2001 | Park et al. ............... 349/40 |
| 2007/0131932 | A1 | * | 6/2007  | Shin et al. ............... 257/57 |

FOREIGN PATENT DOCUMENTS

| KR | 10-2000-0035691 A | 6/2000 |
| KR | 10-2005-0069106 A | 7/2005 |

* cited by examiner

*Primary Examiner*—Julie-Huyen L Ngo
(74) *Attorney, Agent, or Firm*—Birch, Stewart, Kolasch & Birch, LLP

(57) ABSTRACT

A liquid crystal display device and its fabricating method are discussed. According to an embodiment, the liquid crystal display at least one signal line disposed in a display area and extending to a non-display area located outside the display area, a common line crossing the signal line in the non-display area, at least one static electricity preventing element connected between the common line and the signal line in the non-display area, and at least one static electricity preventing auxiliary electrode projected towards the signal line from the static electricity preventing element in the non-display area.

1 Claim, 15 Drawing Sheets

LIQUID CRYSTAL DISPLAY AND FABRICATING METHOD THEREOF

This application claims the priority benefit of Korean Patent Application No. 10-2006-0047068, filed on May 25, 2006, which is hereby incorporated by reference for all purposes as if fully set forth herein.

BACKGROUND OF THE INVENTION

1. Field of the Invention

The present invention relates to a liquid crystal display device and a fabricating method thereof. In particular, the present invention relates to a liquid crystal display device and a fabricating method thereof in which production yield is improved by preventing the defect of a gate line and a data line due to static electricity.

2. Description of the Related Art

A liquid crystal display device comprises a thin film transistor array substrate and a color filter array substrate which face each other with a liquid crystal material in between. The liquid crystal display device also comprises a driving circuit which provides driving signals for driving the liquid crystal material around the two array substrates.

The thin film transistor array substrate comprises gate lines and data lines which cross each other on a lower substrate, thin film transistors each formed on a crossing part of the data lines and gate lines, and pixel electrodes each connected to the corresponding thin film transistor. A driving signal is provided to the corresponding gate line and data line by the driving circuit. The driving circuit is connected to a gate pad formed at the end of the corresponding gate line and a data pad formed at the end of the corresponding data line and provides a driving signal to the gate and data line. The thin film transistor is turned on by a scan signal provided on the corresponding gate line and provides a pixel voltage signal which is provided on the corresponding data line to the pixel electrode.

The color filter array substrate comprises a black matrix which divides a cell area by forming on the area corresponding to the gate line and data line of the upper substrate, a color filter formed on the area partitioned by the black matrix, and a common electrode forming a vertical electric field to drive the liquid crystal material by facing with the pixel electrode formed on the lower substrate.

The thin film transistor array substrate further comprises a static electricity preventing element 8 which is formed on a non-display area surrounding a visible (display) area 10 to block the inflow of the static electricity into the data line (DL) and gate line (GL) disposed in the visible area 10, as shown in FIG. 1.

The static electricity preventing element 8 is connected between a common line (CL) supplied with a standard voltage for driving the liquid crystal and each data line (DL). The static electricity preventing element 8 guides the static electricity flowing into the data line (DL) through the data pad (DP) towards the common line (CL). In addition, the static electricity preventing element 8 connected between the common line (CL) and each gate line guides the static electricity flowing into the gate line (GL) through the gate pad (GP) towards the common line (CL).

The static electricity preventing element 8 comprises a plurality of transistor (T10, T20, T30) driven by a driving voltage higher than a TFT driving (or thresh-hold) voltage which is to select a pixel inside a pixel array area. The plurality of transistor (T10, T20, T30) are disposed on the edge of the pixel array area so that they are connected to the common line (CL). The transistors (T10, T20, T30) are turned on by the high voltage applied to the gate line or the data line when static electricity occurs. Therefore, they guide the over current due to the over-voltage of static electricity at the data and gate line to the common line (CL) which is grounded so as to have lower impedance. On the contrary, the transistors (T10, T20, T30) are not electrically connected to the common line (CL) under normal driving condition and has a high impedance of several MΩ and maintain the turned off status.

The static electricity preventing element 8 is equipped to protect elements of the substrate by discharging the high voltage which occurs during the manufacturing process of the substrate to the ground line. However, in case that high AC voltage static electricity occurs at the data pad (DP) or gate pad (GP), the transistors (T10, T20, T30) of the static electricity preventing element 8 are not turned on normally. As a result, the gate line (GL) or the data line (DL) is damaged as the high AC voltage static electricity flows into the data line (DL) or the gate line (GL) data and dim phenomenon occurs eventually. In other words, as a result, the liquid crystal display device becomes defective and production yield is degraded.

SUMMARY OF THE INVENTION

An object of the present invention is to prevent the defect of gate lines and data lines due to static electricity.

Another object of the present invention is to provide a liquid crystal display device with improved production yield and a manufacturing method thereof.

Another object of the present invention is to provide a liquid crystal display device and its manufacturing method, which address the limitations and disadvantages associated with the related art.

In order to achieve these and other objects of the invention, the liquid crystal display device according to an embodiment comprises a signal line disposed in a display area; a signal pad formed at an end of the signal line extended to a non-display area located outside the display area; a common line located between the signal line and the signal pad in the non-display area; a static electricity preventing element connected between the signal pad and the common line in the non-display area; and a static electricity preventing auxiliary electrode projected towards the signal line from the static electricity preventing element in the non-display area.

The static electricity preventing element of the liquid crystal display device according to the present invention may be projected near to the signal line from the connecting electrode.

The static electricity preventing element of the liquid crystal display device according to another aspect of the present invention, comprises a first static electricity preventing element connected between an odd numbered signal pad and a common line; and a second static electricity preventing element connected between an even numbered signal pad and the common line, wherein the first and the second static electricity preventing elements face each other with the common line in between.

The static electricity preventing element of the liquid crystal display device according to an embodiment of the present invention further comprises a static electricity preventing auxiliary line projected towards the signal line connected to the static electricity preventing element from the common line connected to the static electricity preventing element.

The static electricity preventing auxiliary electrode of the liquid crystal display device according to an embodiment of the present invention comprises a first static electricity preventing auxiliary electrode projected towards the odd numbered signal line from the connecting electrode; and a second static electricity preventing auxiliary electrode projected towards the even numbered signal line from the connecting electrode.

The static electricity preventing auxiliary electrode of the liquid crystal display device according to an embodiment of the present invention comprises a first static electricity preventing auxiliary line projected towards the odd numbered signal line connected to the first static electricity preventing element from the common line connected to the first static electricity preventing element; and a second static electricity preventing auxiliary line projected towards the even numbered signal line connected to the second static electricity preventing element from the common line connected to the second static electricity preventing element.

The liquid crystal display device according to an embodiment of the present invention further comprises a static electricity preventing auxiliary line projected towards the signal line connected to the static electricity preventing element from the common line connected to the static electricity preventing element.

The static electricity preventing auxiliary line of the liquid crystal display device according to an embodiment of the present invention comprises a first static electricity preventing auxiliary line projected towards the odd numbered signal line connected to the first static electricity preventing element from the common line connected to the first static electricity preventing element; and a second static electricity preventing auxiliary line projected towards the even numbered signal line connected to the second static electricity preventing element from the common line connected to the second static electricity preventing element.

A liquid crystal display device according to an embodiment of the present invention comprises a signal line disposed in a display area; a signal pad formed at an end of the signal line extended to a non-display area located outside the display area; a common line located between the signal line and the signal pad formed in the non-display area; a static electricity preventing element connected between the signal pad and the signal line in the non-display area; and a static electricity preventing auxiliary line projected towards the signal line connected to the static electricity preventing element from the common line connected to the static electricity preventing element in the non-display area.

The static electricity preventing auxiliary line of the liquid crystal display device according to an embodiment of the present invention includes a first static electricity preventing auxiliary line projected towards the odd numbered signal line connected to the first static electricity preventing element from the common line connected to the first static electricity preventing element; and a second static electricity preventing auxiliary line projected towards the even numbered signal line connected to the second static electricity preventing element from the common line connected to the second static electricity preventing element.

A manufacturing method of a liquid crystal display device according to an embodiment of the present invention comprises forming a gate line in a display area, a gate pad at an end of the gate line extended to a non-display area located outside the display area, a common line between the gate pad and the gate line in the non-display area and gate electrodes of a static electricity preventing element between the common line and the gate pad at the non-display area; forming a data line crossing the gate line in the display area, a data pad having the common line between the data line at an end of the data line extended to the non-display area, and source electrodes and drain electrodes of the static electricity preventing element between the common line and the gate pad in the non-display area; and forming a static electricity preventing auxiliary electrode projected towards the gate line from the static electricity preventing element in the non-display area.

According to an aspect of the present invention, there is provided a liquid crystal display device including at least one signal line disposed in a display area and extending to a non-display area located outside the display area, a common line crossing the signal line in the non-display area, at least one static electricity preventing element connected between the common line and the signal line in the non-display area, and at least one static electricity preventing auxiliary electrode projected towards the signal line from the static electricity preventing element in the non-display area.

According to an aspect of the present invention, there is provided a liquid crystal display device including at least one signal line disposed in a display area and extending to a non-display area located outside the display area, a common line crossing the signal line in the non-display area, at least one static electricity preventing element connected between the common line and the signal line in the non-display area, and at least one static electricity preventing auxiliary line projected towards the signal line from the common line in the non-display area.

According to an aspect of the present invention, there is provided a manufacturing method for a liquid crystal display device, including forming at least one signal line disposed in a display area and extending to a non-display area located outside the display area, forming a common line crossing the signal line in a non-display area, forming at least one static electricity preventing element connected between the common line and the signal line in the non-display area, and forming at least one static electricity preventing auxiliary electrode projected towards the signal line from the static electricity preventing element in the non-display area.

According to an aspect of the present invention, there is provided a manufacturing method for a liquid crystal display device, including forming at least one signal line disposed in a display area and extending to a non-display area located outside the display area, forming a common line crossing the signal line in the non-display area, forming at least one static electricity preventing element connected between the common line and the signal line in a non-display area, and forming at least one static electricity preventing auxiliary line projected towards the signal line from the common line in the non-display area.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Reference will now be made in detail to the preferred embodiments of the present invention referring to from FIG. 2 to FIG. 11.

Figure 1:
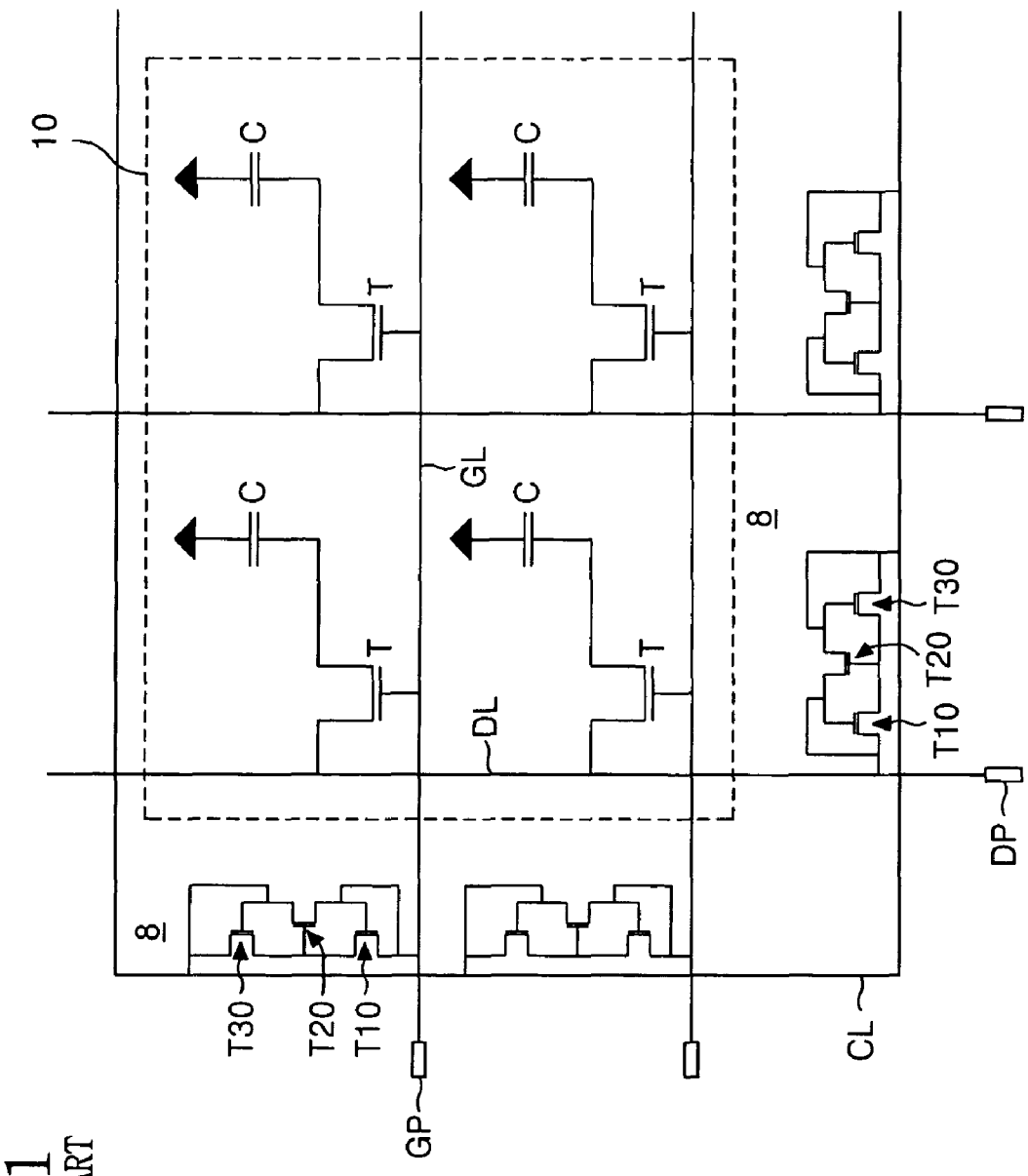
FIG. 1 is a circuit diagram illustrating a liquid crystal display device according to a related art.
Figure 2:
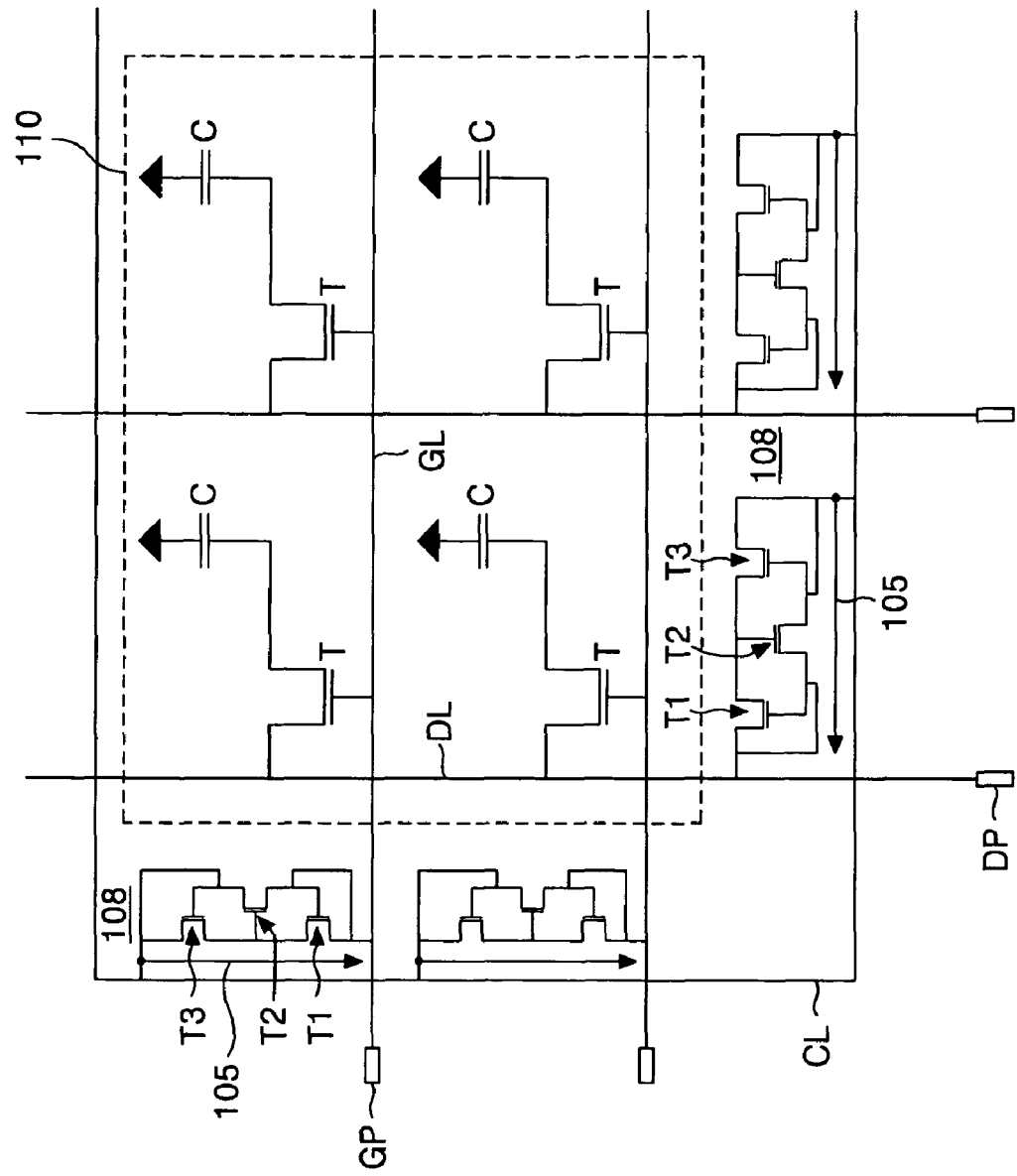
FIG. 2 is a circuit diagram briefly illustrating a liquid crystal display device of a first preferred embodiment of the present invention.

FIG. 2 is a circuit diagram briefly illustrating a liquid crystal display device according to a first embodiment of the present invention.

Referring to FIG. 2, the liquid crystal display device of the present invention includes a plurality of data lines (DL) and gate lines (GL) which cross each other in a display area 110, a plurality of driving transistors (T) each formed at the crossing of the corresponding data line (DL) and gate line (GL), and a liquid crystal cell (C) at each pixel unit area. The liquid crystal cell (C) is formed between a thin film transistor array substrate and a color filter array substrate of the liquid crystal display device.

Each liquid crystal cell (C) includes a pixel electrode connected to the drain electrode of the driving thin film transistor (T), a common electrode formed at the color filter array substrate facing with the pixel electrode, and a liquid crystal provided between the common and pixel electrodes.

The non-display area, i.e., an area surrounding the display area 110, comprises a common line (CL) in which a standard voltage for driving the liquid crystal is supplied, data pads (DP) and gate pads (GP) connected to the data lines (DL) and gate lines (GL) which are extended from the display area 110, and at least one static electricity preventing element 108 connected between the data line (DL) and the common line (CL) and between the gate line (GL) and the common line (CL).

In all embodiments of the present invention, although only two data lines, two gates lines and their corresponding static electricity preventing element(s) may be shown, one skilled in the art would readily recognize that the liquid crystal display device has more data lines, more gate lines and more corresponding static electricity preventing element(s). All the components of the liquid crystal display device are operatively configured and coupled.

Each static electricity preventing element 108 guides the static electricity which flows into the data line (DL) or the gate line (GL) through the data pad (DP) or the gate pad (GP) towards the common line (CL), and blocks the static electricity from flowing into the data line (Dl) or the gate line (GL).

Each static electricity preventing element 108 comprises a first transistor (T1), a second transistor (T2) and a third transistor (T3). Depending on whether the static electricity preventing element 108 is connected between a gate line and the common line or between a data line and the common line, the source electrode and the gate electrode of the first transistor (T1) are connected to the data line (DL) or the gate line (GL). The drain electrode of the first transistor (T1) is connected the gate electrode of the second transistor (T2). The second transistor (T2) has its source electrode connected to the data line (DL) or the gate line (GL). The gate electrode of the second transistor (T2) is connected to the drain electrode of the first transistor (T1). The drain electrode of the second transistor (T2) is connected to the gate electrode of the third transistor (T3). The third transistor (T3) has its source electrode connected to the drain electrode of the first transistor (T1) and to the gate electrode of the second transistor (T2). The drain electrode of the third transistor (T3) is connected to the common line (CL).

Accordingly, if the direct current high voltage static electricity (higher than the threshold voltage of T1 or T3) is applied to the gate line (GL) or the data line (DL), the first transistor (T1) or the third transistor (T3) is turned on sequentially. Therefore, the static electricity preventing element 108 guides the static electricity of the direct current high voltage applied to the data line (Dl) or the gate line (GL) towards the common line (CL). As a result the static electricity of the direct current high voltage is blocked from flowing into the data line (Dl) or the gate line (GL). Further, damages to the data line (Dl) or the gate line (GL) of the display area 110 due to the static electricity of the direct current high voltage is prevented according to the present invention.

Figure 3:
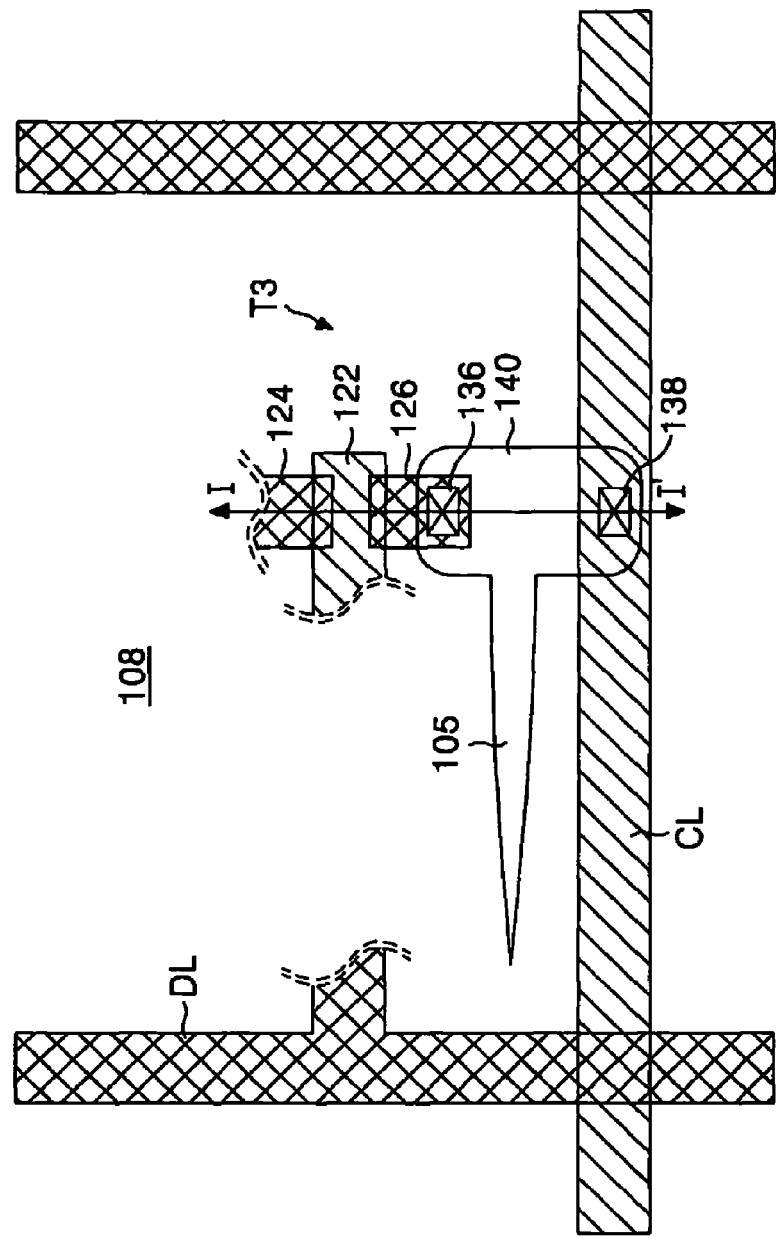
FIG. 3 is illustrating a part of the liquid crystal display device of the first preferred embodiment of the present invention in detail.

As shown in FIGS. 2 and 3, the liquid crystal display device according to the present invention further comprises a static electricity preventing auxiliary electrode/line 105 projected towards the data line (DL) or gate line (GL) from a connection electrode 140 which connects to the common line (CL) and connects a drain electrode 126 of the third transistor (T3) to the common line (CL).

Figure 4:
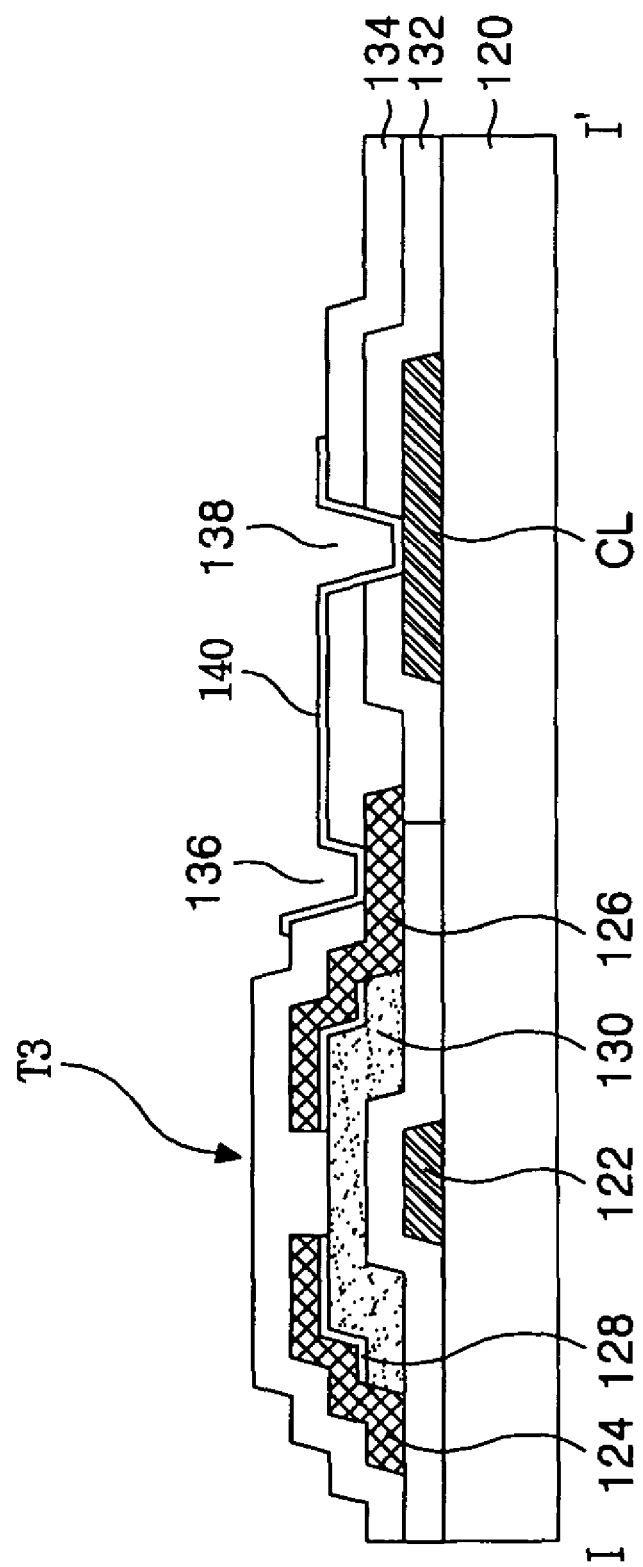
FIG. 4 is a cross sectional diagram cut along line I-I' illustrated in FIG. 3.

Referring to FIG. 3 and FIG. 4, one static electricity preventing auxiliary electrode 105 projected towards the data line (DL) will be described in detail as an example, but each electrode 106 projected toward a data line or gate line has the same or similar operation and configuration. That is, the static electricity preventing auxiliary electrode 105 projected towards the gate line (GL) has the identical configuration and operation principle with the static electricity preventing auxiliary electrode 105 projected towards the data line (DL). Therefore, the description of the electrode 105 projecting towards the gate line (GL) will be omitted.

More specifically, FIG. 3 is a diagram showing an example of a part of a static electricity preventing element 108 connected to the common line (CL) and a data line (DL) in detail. FIG. 4 is a cross sectional diagram cut along line I-I' represented in FIG. 3.

Referring to FIG. 3 and FIG. 4, the static electricity preventing element 108 according to the first preferred embodiment of the present invention comprises a common line (CL)

formed on a substrate 120 (e.g., a lower substrate of the TFT array substrate), a gate electrode 122 of the third transistor (T3) formed on the same layer with the common line (CL), a source electrode 124 of the third transistor (T3) connected to a drain electrode of the first transistor (T1, refer to FIG. 2), a drain electrode 126 of the third transistor (T3) which is separated from the source electrode 124 with a channel of the third transistor (T3) in between, an active layer 130 of the third transistor (T3) forming the channel which overlaps with the gate electrode 122 of the third transistor (T3) having a gate insulation layer 132 in between and is formed between the source electrode 124 and the drain electrode 126 of the third transistor (T3), and an ohmic contact layer 128 of the third transistor (T3) for reducing the contact resistance between the active layer 130 and the source electrode 124 and between the active layer 130 and the drain electrode 126 of the third transistor (T3).

The static electricity preventing element 108 according to the first preferred embodiment of the present invention further comprises a first contact hole 136 which exposes the drain electrode 126 of the third transistor (T3) by penetrating a protection layer 134, a second contact hole 138 which exposes the common line (CL) by penetrating the protection layer 134, a connecting electrode 140 which connects the drain electrode 126 of the third transistor (T3) and the common line (CL) through the first contact hole 136 and the second contact hole 138, and a static electricity preventing auxiliary electrode/line 105 projected towards the data line (DL) from the connecting electrode 140.

Therefore, the static electricity preventing element 108 can guide the high AC voltage static electricity toward the common line (CL) through the static electricity preventing auxiliary electrode 105 which is projected towards the data line (DL) by the principle of lightening rod even if the first transistor (T1) or the third transistor (T3) is not turned on normally, when the high AC voltage static electricity is applied through the data pad (DP, refer to FIG. 2). If applied, the passivation layer 134 located between the data line (DL) and the static electricity preventing auxiliary electrode 105 can be damaged by the high AC voltage static electricity of, e.g., 10s KeV. Accordingly, the static electricity preventing element 108 of the present invention discharges the high AC voltage static electricity which is guided through the static electricity preventing auxiliary electrode 105 through the common line (CL) using the connecting electrode 140 to prevent such damage. As result, the high AC voltage static electricity can be blocked and prevented from being applied to the data line (DL) of the display area 110.

The manufacturing method of the liquid crystal display device according to the first preferred embodiment of the present invention will be described referring to FIG. 5A though FIG. 5E. In each of FIGS. 5A-5E, the upper drawing shows a top plan view of the components as shown in FIG. 3 and the lower drawing shows a cross-sectional view of the components as shown in FIG. 4.

Figure 5A:
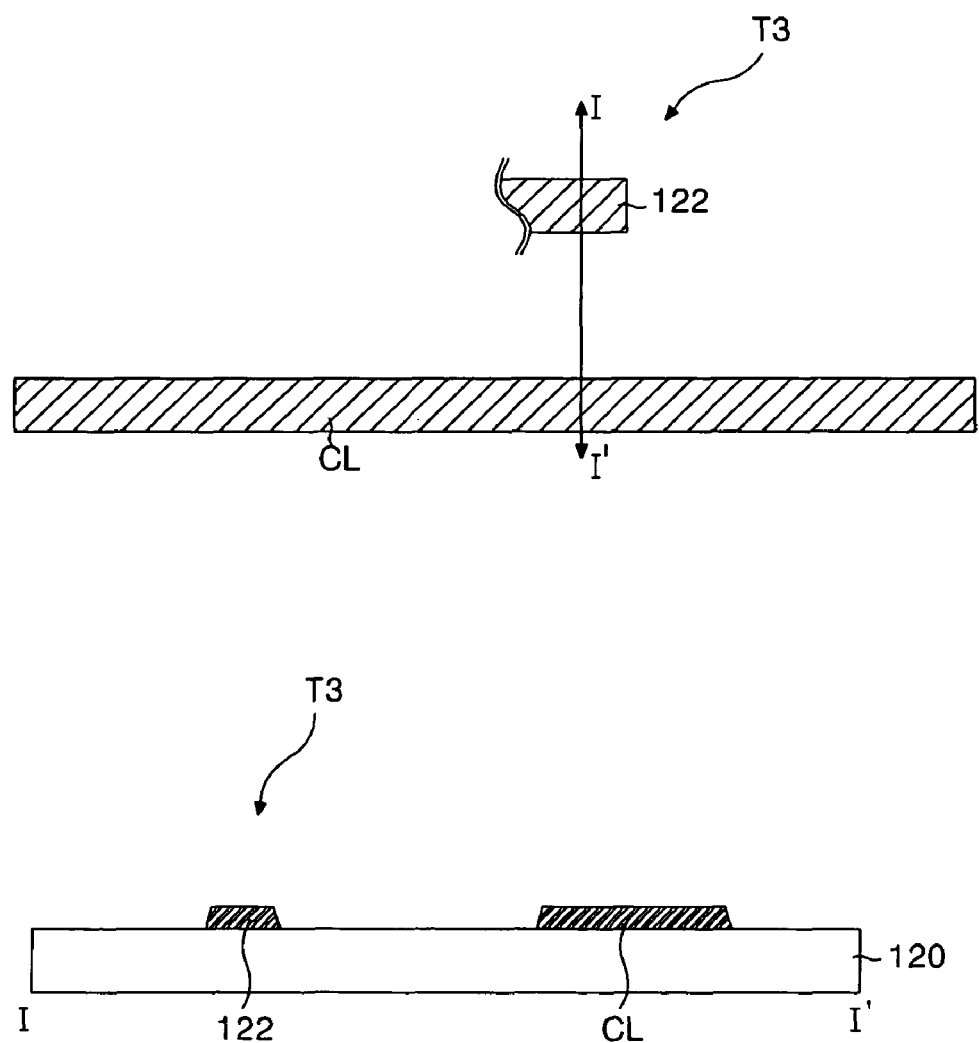
FIG. 5A-FIG. 5E are cross sectional diagrams and plain diagrams illustrating the manufacturing method of a liquid crystal display device according to the first preferred embodiment of the present invention.

Referring to FIG. 5A, the liquid crystal display device according to the first preferred embodiment of the present invention includes a gate electrode 122 of the third transistor (T3) and a common line (CL) formed by carrying out photolithography and etching after depositing a gate metal later using a deposition method like sputtering and PECVD on a substrate 120. The gate metal includes Cr, Mo, Al, or aluminum alloy such as AlNd.

Figure 5B:
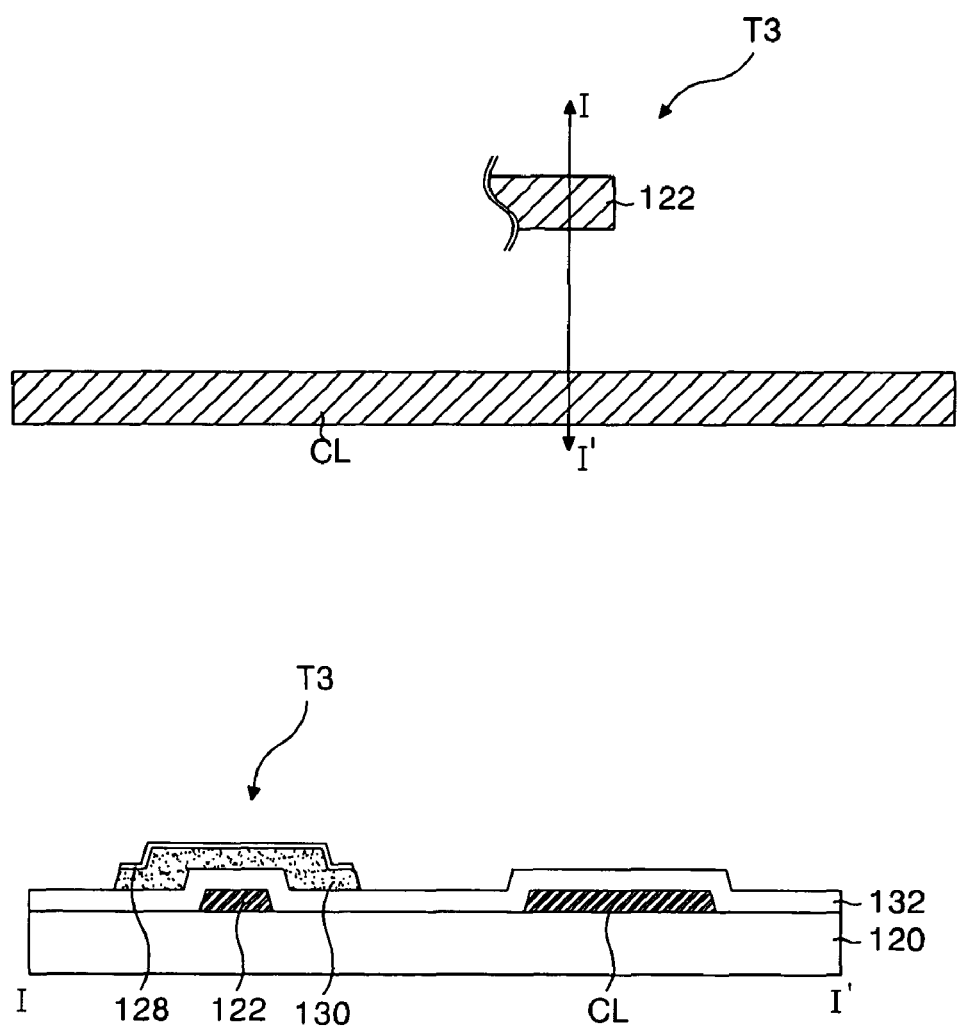

Referring to FIG. 5B, a gate insulation layer 132 is formed on the substrate 120 in which the common line (CL) and gate electrode 122 of the third transistor (T3) are formed. Depositing a first active layer and a second active layer by a deposition method like PEVCD and sputtering, and conducting the photolithography and etching, an active layer 130 and an ohmic contact layer 128 which overlaps the active layer 130 are formed on the gate electrode 122 of the third transistor (T3) having the gate insulation later 132 in between. Amorphous silicon in which n+ or p+ impurities are doped may be used for the first active later, and amorphous silicon in which impurities are not doped may be used for the second active layer.

Figure 5C:
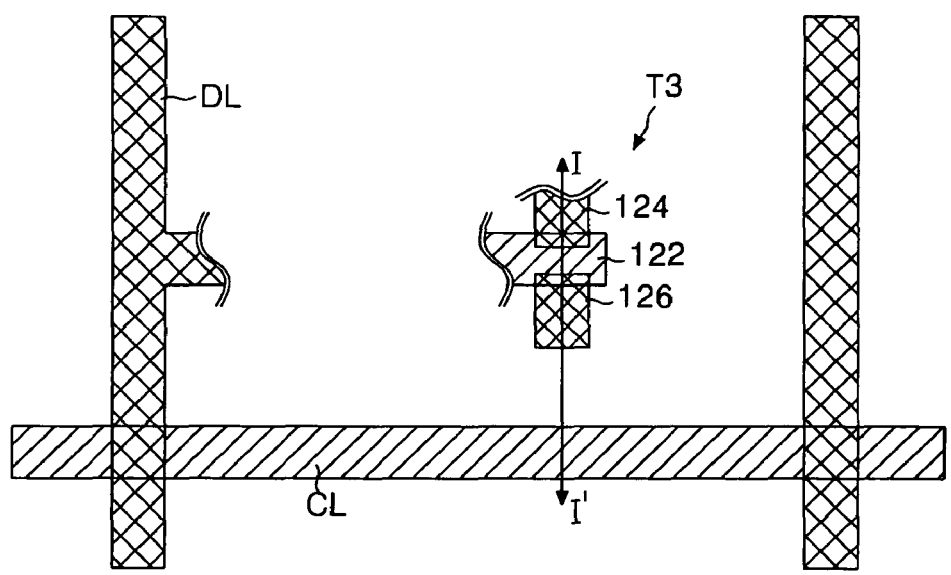
Figure 5C:
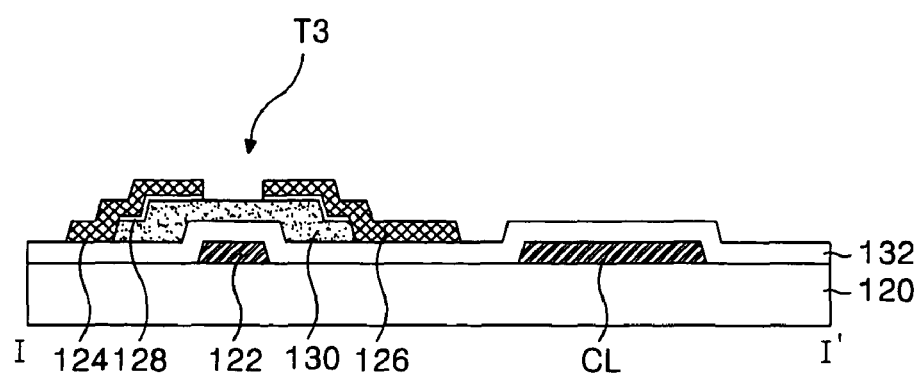

Referring to FIG. 5C, a source/drain metal layer is deposited by a deposition method like PEVCD and sputtering on the substrate 120 on which the active layer 130 and the ohmic contact layer 128 are formed. Hereinafter, a drain electrode 126 and a source electrode 124 of the third transistor (T3) which is separated with a channel area of the third transistor (T3) in between, and a data line (DL) are formed by conducting the photolithography and etching. The ohmic contact layer 128 is separated from the channel area of the third transistor (T3) along with the source electrode 124 and the drain electrode 126 of the third transistor (T3). Metals like Mo and Cu can be used for the source/drain metal layer.

Figure 5D:
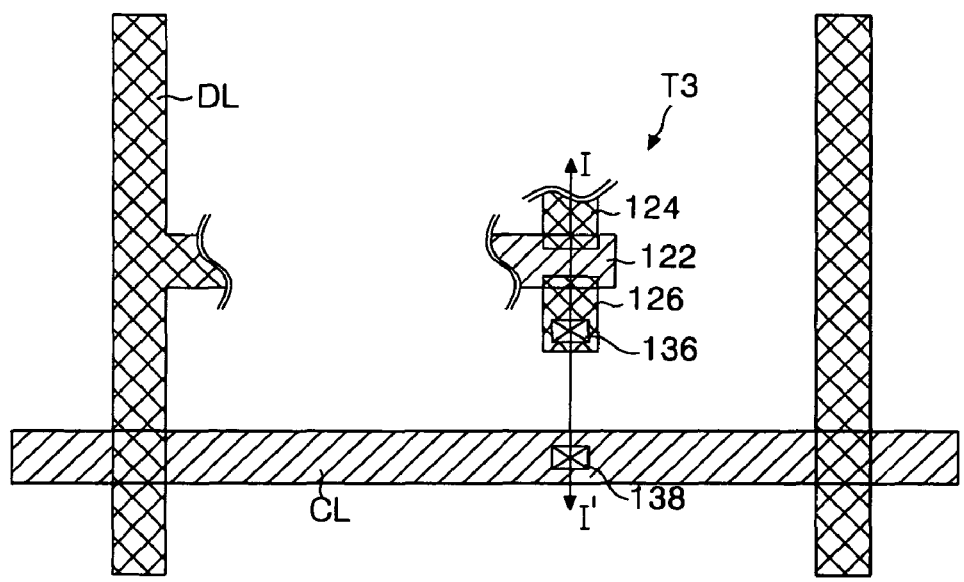
Figure 5D:
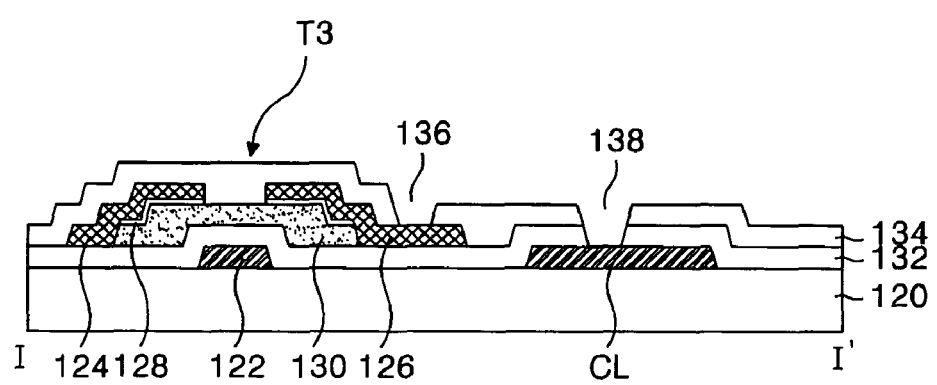

Referring to FIG. 5D, a passivation layer 134 having a first contact hole 136 which exposes the drain electrode 126 of the third transistor (T3) and a second contact hole 138 which exposes the common line (CL) are formed on the substrate 120 on which the data line (DL) and the source electrode 124 and drain electrode 126 of the third transistor (T3).

Figure 5E:
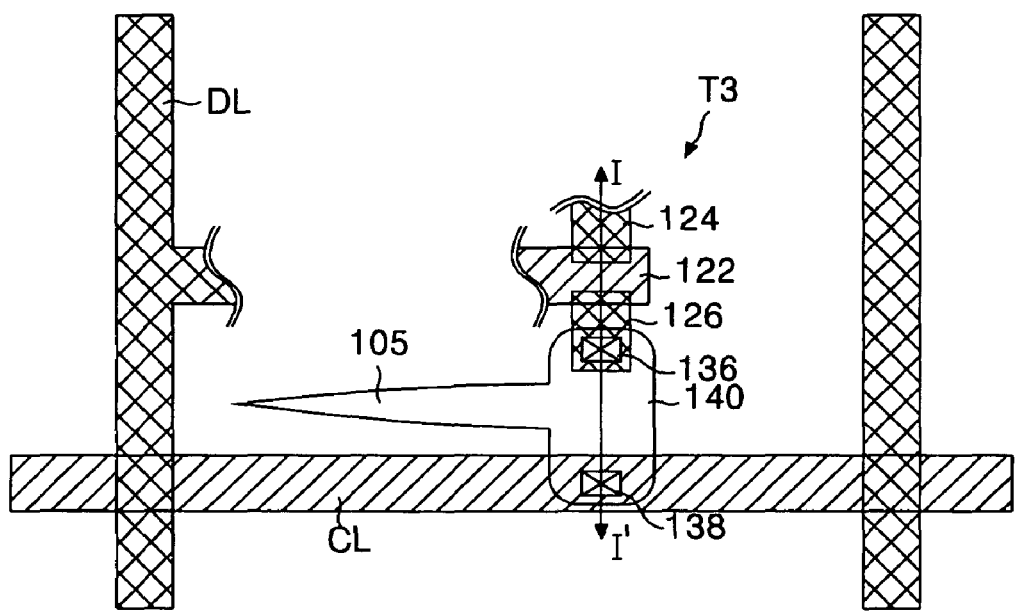
Figure 5E:
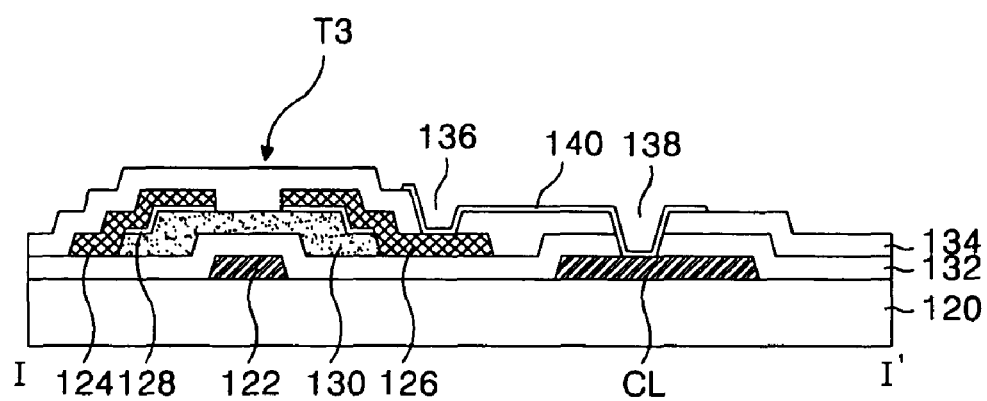

Referring to FIG. 5E, a connecting electrode 140 which connects the common line (CL) and the drain electrode 126 of the third transistor (T3) through the first contact hole 136 and second contact hole 138, respectively, and a static electricity preventing auxiliary electrode 105 projected towards the data line (DL) from the connecting electrode 140 are formed by photolithography and etching after depositing a (transparent) conductive material by a deposition method like PEVCD and sputtering on the substrate 120 in which the passivation layer 134 is formed. One of indium tin oxide (ITO), tin oxide (TO), indium tin zinc oxide (ITZO) and indium zinc oxide (IZO) can be used as the transparent conductive material.

Figure 6:
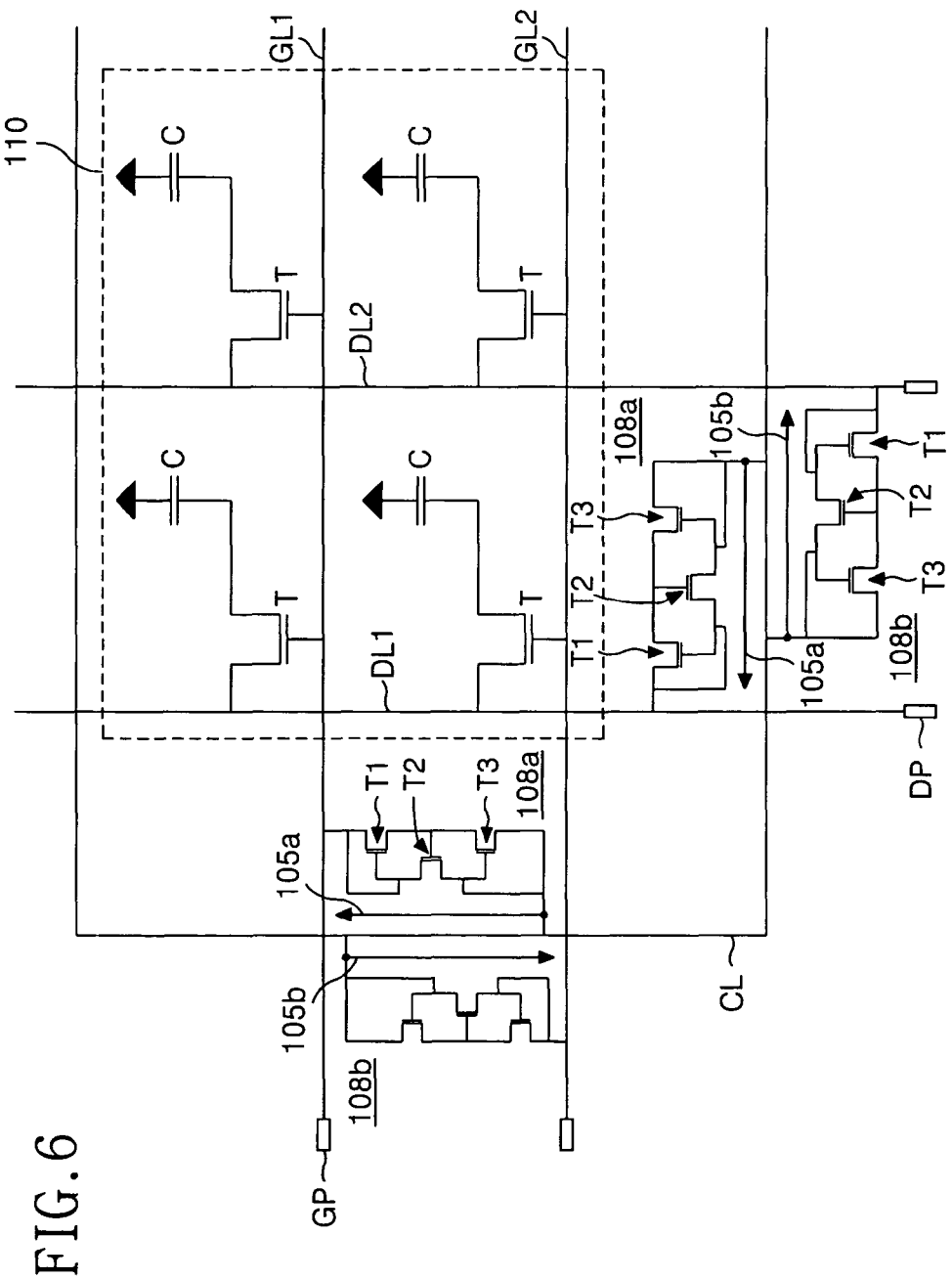
FIG. 6 is a circuit diagram briefly illustrating a liquid crystal display device of a second preferred embodiment of the present invention.
Figure 7:
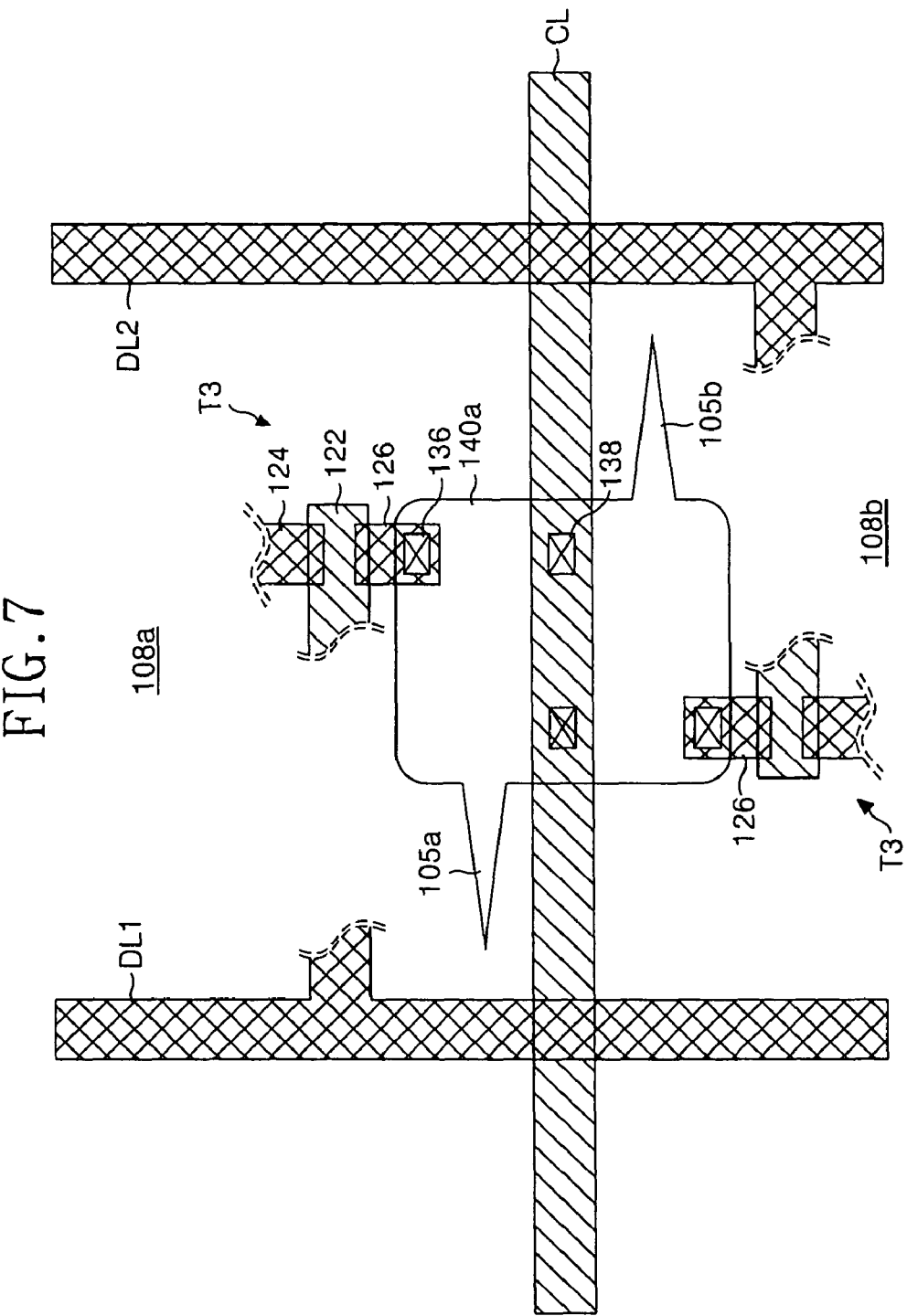
FIG. 7 is illustrating a part of the liquid crystal display device of the second preferred embodiment of the present invention in detail.

FIG. 6 is a circuit diagram briefly showing a liquid crystal display device according to a second preferred embodiment of the present invention. FIG. 7 is a diagram showing a part of the liquid crystal display device of the second preferred embodiment in detail. Hereinafter, generally the description of the second preferred embodiment that is identical to that of the first preferred embodiment will be omitted.

Referring to FIG. 6 and FIG. 7, the liquid crystal display device according to the second preferred embodiment of the present invention comprises a first static electricity preventing element 108a connected to an odd numbered data line (DL1) or an odd numbered gate line (GL1), and a second static electricity preventing element 108b connected to an even numbered data line (DL2) or an even numbered gate line (GL2).

Each of the first and second static electricity preventing elements 108a includes the first, second and third transistors (T1, T2 and T3) that have the same configuration as the transistors T1, T2 and T3 of FIG. 2, but connected to each odd or even numbered data or gate line (DL1, DL2, GL1, GL2). Although only two elements 108a and 108b are shown for the gate lines GL1 and GL2 and the data lines DL1 and DL2, the liquid crystal display device can include elements 108a and 108b for each pair of odd and even numbered gate lines and for each pair of odd and even numbered data lines. For example, the first and second elements 108a and 108b are provided for the pair of data lines DL3 and DL4, and also for the pair of gate lines GL3 and GL4, and so on. The first static electricity preventing element 108a and the second static electricity preventing element 108b face each other with the common line (CL) in between.

A connecting electrode 140a, which connects a drain electrode 126 of the third transistor (T3) of the first static electricity preventing element 108a and a drain electrode 126 of the third transistor (T3) of the second static electricity preventing element 108b and the common line (CL) is included. A first static electricity preventing auxiliary electrode 105a projecting towards the odd numbered data line (DL1) (or gate line GL1) in FIG. 7 from the connecting electrode 140a and a second static electricity preventing auxiliary electrode 105b projecting towards the even numbered data line (DL2) (or gate line GL2) from the connecting electrode 140a are further included. The element 108a (or 108b) can be considered to include the element 105a (or 105b).

The liquid crystal according to the second preferred embodiment of the present invention can guide the high AC voltage static electricity through the first and second static electricity preventing auxiliary electrodes 105a, 105b which are projected towards the odd numbered data line (DL1) and even numbered data line (DL2), respectively according to the principle of lightening rod, even if the first transistor (T1) or the third transistor (T3) is not turned-on when the high AC voltage static electricity is applied through the data pad and gate pad (DP, GP). The liquid crystal display device according to the present invention discharges the high AC voltage static electricity guided via the first static electricity preventing auxiliary electrode 105a and the second static electricity preventing auxiliary electrode 105b to the common line (CL) through the connecting electrode 140a. Thus, it can block the high AC voltage static electricity from being applied to the odd numbered data and gate lines (DL1 and GL1) and even numbered data and gate lines (DL2 and GL2) of the display area 110.

The manufacturing method of the liquid crystal display device of the present invention according to the second preferred embodiment is identical to that of the first preferred embodiment, except for the process of forming the structures that are different from the first embodiment, e.g., the shape of the connecting electrode 140a and the first static electricity preventing auxiliary electrode 105a and the second static electricity preventing auxiliary electrode 105b. Therefore, the discussion of the method of forming the liquid crystal display device of the second embodiment is omitted.

Figure 8:
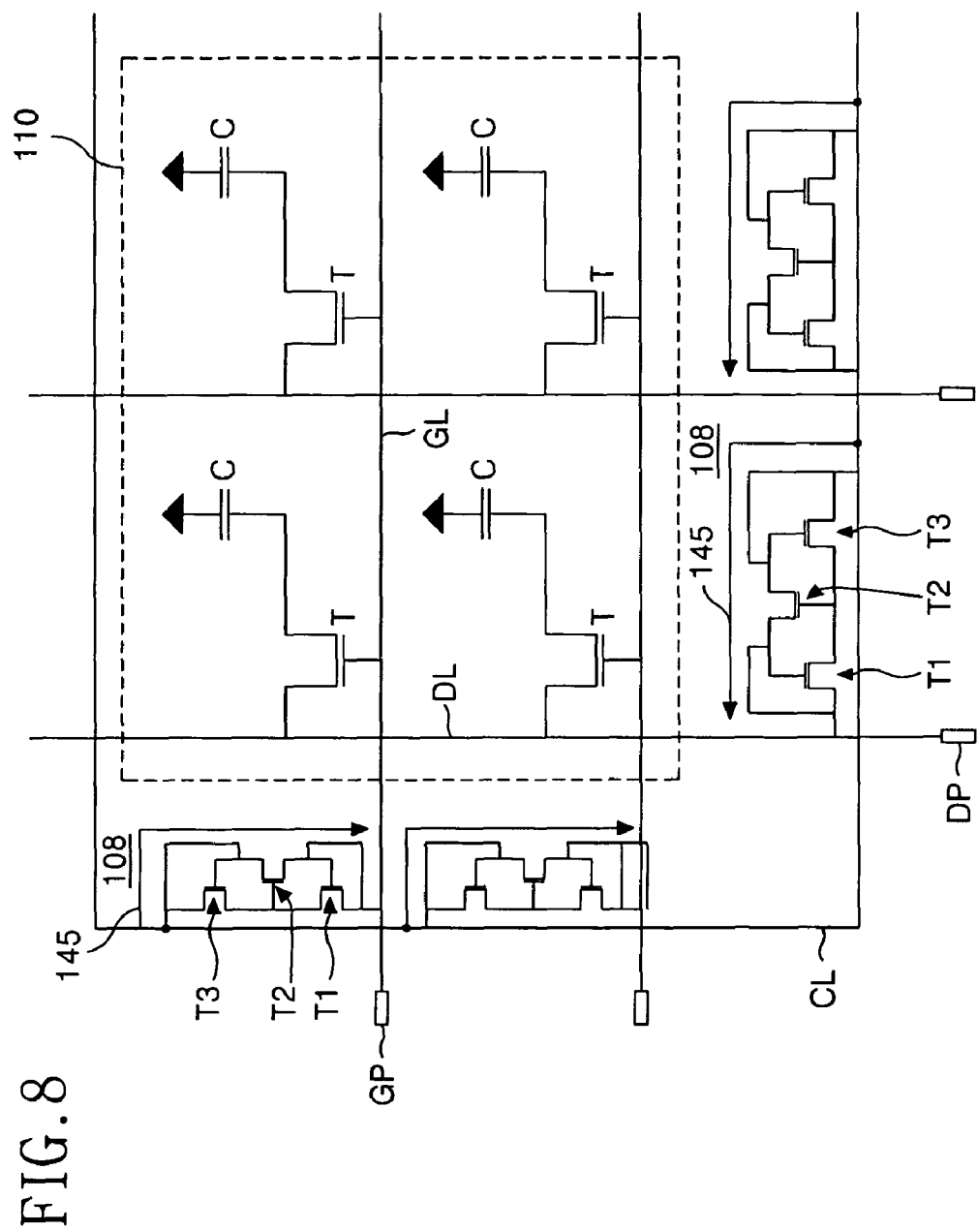
FIG. 8 is a circuit diagram illustrating a part of a liquid crystal display device of a third preferred embodiment of the present invention in detail.
Figure 9:
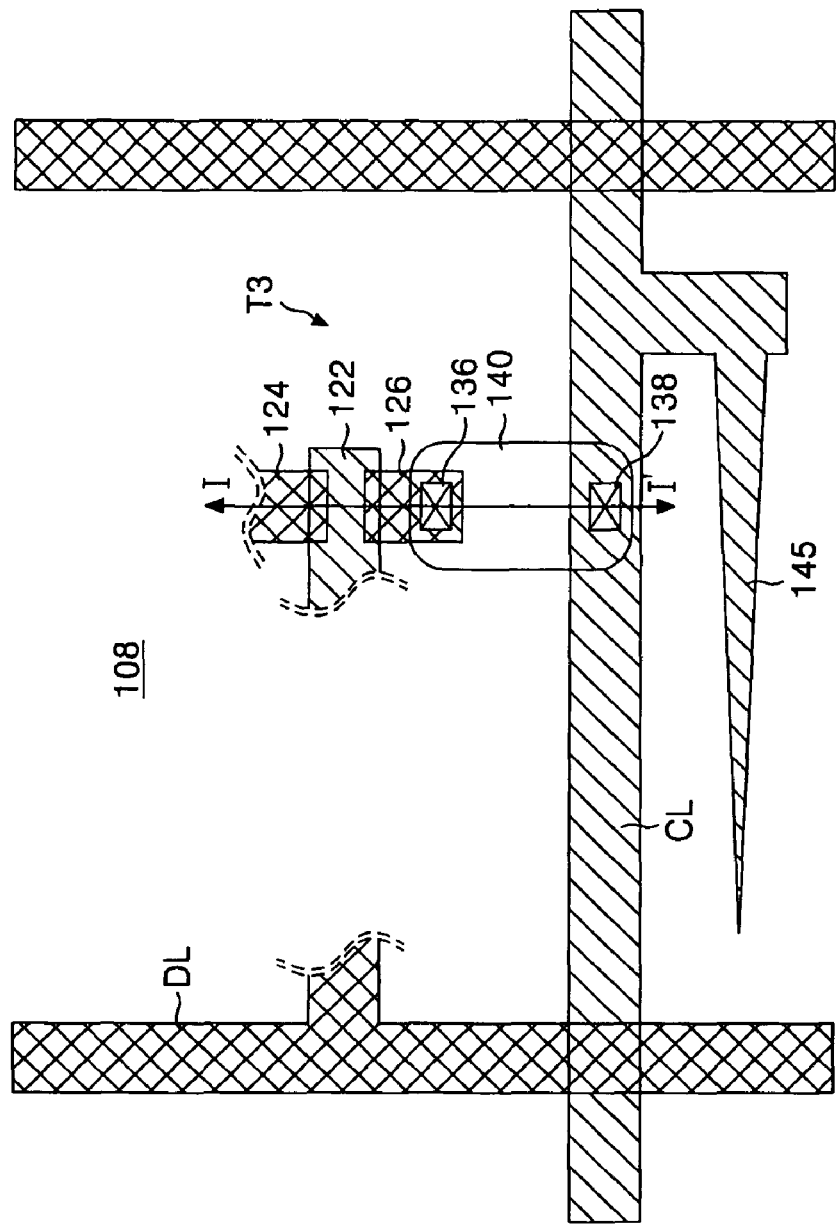
FIG. 9 is illustrating a part of the liquid crystal display device of the third preferred embodiment of the present invention in detail.

FIG. 8 is a circuit diagram briefly showing a liquid crystal display device according to a third preferred embodiment of the present invention. FIG. 9 is a diagram showing a part of the liquid crystal display device of the third preferred embodiment in detail. Regarding the third preferred embodiment, a description thereof which is identical to that of the first preferred embodiment will be omitted.

Referring to FIG. 8 and FIG. 9 and comparing to the first preferred embodiment, the third preferred embodiment of the liquid crystal display device comprises a plurality of static electricity preventing auxiliary lines 145 each projected towards an adjacent corresponding data line (DL) (or gate line (GL)) from a common line (CL), instead of the static electricity preventing auxiliary electrode 105 of the first embodiment. Other features such as the static electricity preventing electrodes 108 each having the transistors T1, T2 and T3 as shown in FIG. 2 are also provided in the liquid crystal display device of the third embodiment. But there may be no element 105 extending from the electrode 140 in FIGS. 8 and 9.

Accordingly, the liquid crystal display device according to the third preferred embodiment can guide high AC voltage static electricity through the static electricity preventing auxiliary line 145 which is projected towards the data or gate line (DL,GL) according to the principle of lightening rod, even if the first transistor (T1) or the third transistor (T3) of the static electricity preventing element 108 is not turned-on when the high AC voltage static electricity is applied through the data or gate pad (DP,GP). The liquid crystal display device according to the present invention makes the guided high AC voltage static electricity flow into the common line (CL) via the static electricity preventing auxiliary line 145. Thus, it blocks the high AC voltage static electricity from being applied to the data and gate lines (DL and GL) of the display area 110.

The manufacturing method of the liquid crystal according to the third preferred embodiment of the present invention is identical to the first preferred embodiment, except for the process of forming the static electricity preventing auxiliary lines 145 projected towards the data and gate lines (DL and GL) from the common line(s) (CL). Therefore a discussion thereof is omitted.

As a variation, the liquid crystal according to the third preferred embodiment of the present invention can comprise the static electricity preventing auxiliary line 145 projected towards the data line (DL) from the common line (CL) with the static electricity preventing auxiliary electrode 105 projected towards the data line (DL) from the common electrode 140 described in the first embodiment. Similar features can apply to the static electricity preventing line 145 projected towards the gate line (GL).

Figure 10:
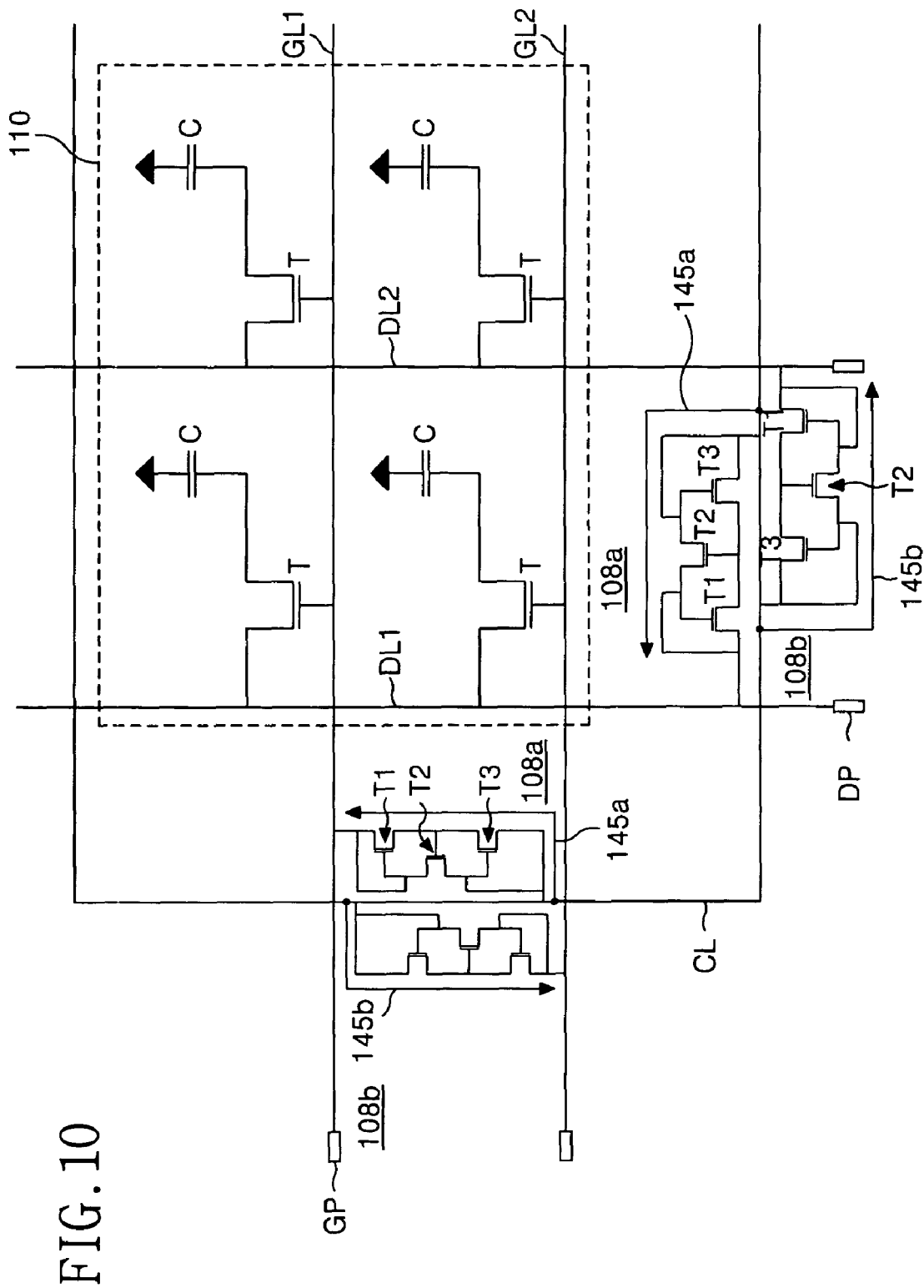
FIG. 10 is a circuit diagram illustrating a liquid crystal display device of a fourth preferred embodiment of the present invention in detail.
Figure 11:
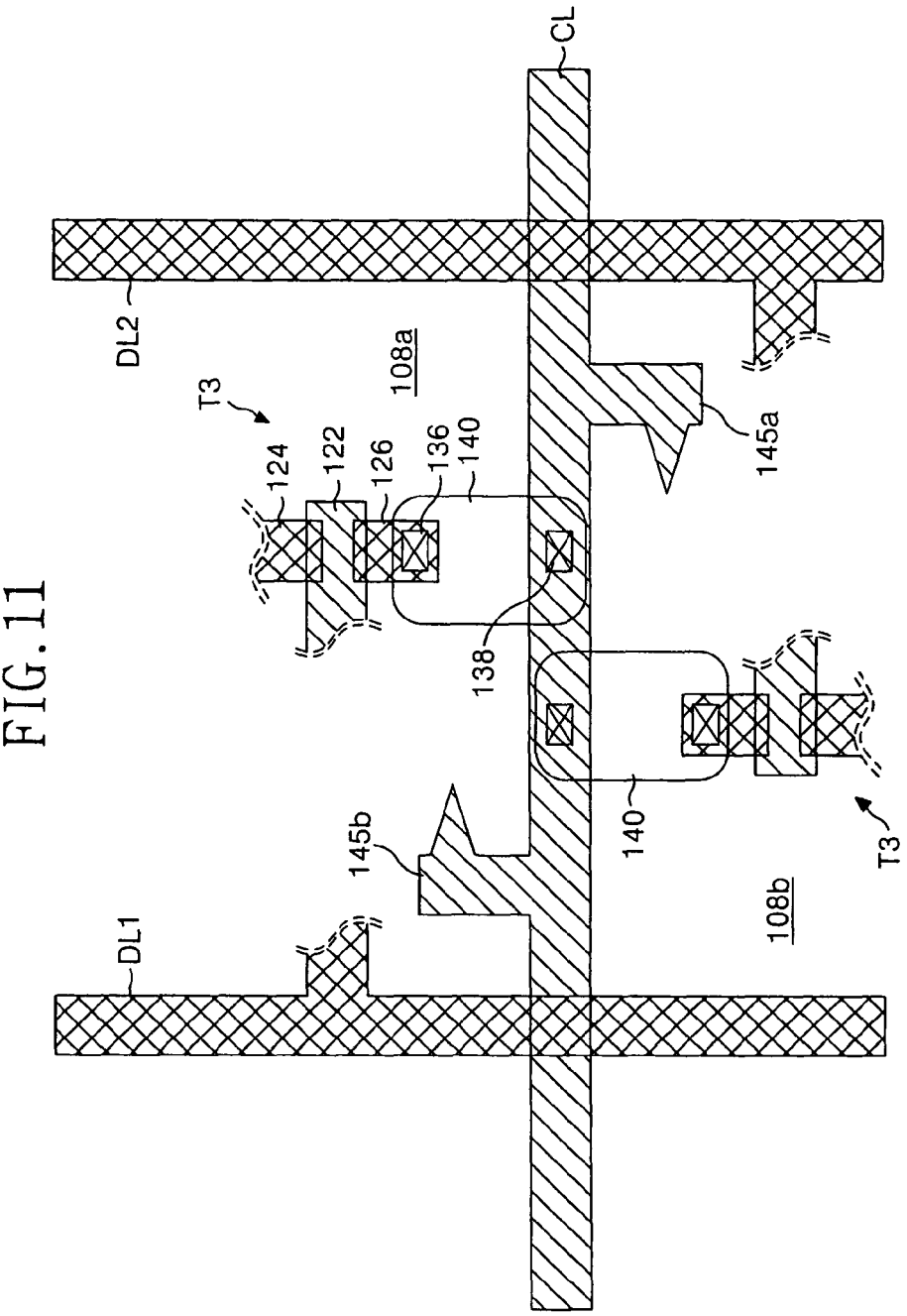
FIG. 11 illustrates a part of the liquid crystal display device of the fourth preferred embodiment of the present invention in detail.

FIG. 10 is a circuit diagram showing a part of a liquid crystal display device in detail according to a fourth preferred embodiment of the present invention. FIG. 11 is a diagram showing a part of the liquid crystal device of the fourth preferred embodiment in detail. Regarding the fourth preferred embodiment, generally a description thereof which is identical to that of the second preferred embodiment will be omitted.

Referring to FIGS. 10 and 11 and comparing to the second preferred embodiment, the fourth preferred embodiment comprises a first static electricity preventing auxiliary line 145a and a second static electricity preventing auxiliary line 145b projected towards an odd numbered data line (DL1) (or gate line GL1) and an even numbered data line (DL2) (or gate line GL2), respectively, from a common line (CL), instead of the first and second static electricity preventing auxiliary electrodes 105a and 105b described in the second embodiment.

The liquid crystal display device according to the fourth preferred embodiment can guide high AC voltage static electricity through the first and second static electricity preventing auxiliary lines 145a, 145b which are projected towards the odd numbered data line (DL1) and the even numbered data line (DL2), respectively, and toward the odd and even numbered gate lines (GL1 and GL2), respectively, according to the principle of lightening rod even if the first transistor (T1) or the third transistor (T3) is not turned-on when the high AC voltage static electricity is applied through the data or gate pad (DP, GP). The liquid crystal display device according to the present invention makes the guided high AC voltage static electricity flow into the common line (CL) via the first and the second static electricity preventing auxiliary lines 145a, 145b. Thus it can block the high AC voltage static electricity from being applied to the odd numbered data and gate lines (DL1 and GL1) and even numbered data and gate lines (DL2 and GL2) of the display area 110.

The manufacturing method of the liquid crystal display device according to the fourth preferred embodiment of the present invention is identical to the second preferred embodiment, except for forming the first and second static electricity preventing auxiliary lines 145*a*, 145*b* projected towards the odd numbered data and gate lines (DL1 and GL1) and even numbered data and gate lines (DL2 and GL2) from the common line (CL), respectively. Therefore a discussion thereof is omitted.

Further, as a variation, the liquid crystal display device according to the fourth preferred embodiment of the present invention can comprise the first and second static electricity preventing auxiliary lines 145*a*, 145*b* projected towards the odd numbered and even numbered data and gate lines (DL1, DL2, GL1, GL2, . . . ) from the common line(s) (CL), and further comprise first and second static electricity preventing auxiliary electrodes 105*a*, 105*b* projected towards the odd numbered and even numbered data and gate lines (DL1, DL2, GL1, GL2, . . . ) from the common electrode 140 discussed in the previous embodiment.

The manufacturing method of the liquid crystal display device of the embodiments of the present invention can guide high AC voltage static electricity through a static electricity preventing auxiliary electrode and/or a static electricity preventing auxiliary line which are/is projected towards the data line(s) and/or gate line(s) according to the principle of lightening rod, even if the first transistor (T1) or the third transistor (T3) therof is not turned-on when the high AC voltage static electricity is applied via the data/gate pad. The liquid crystal display device according to the present invention makes the guided high AC voltage static electricity flow into the common line via the static electricity preventing auxiliary electrode and/or static electricity preventing auxiliary line. Thus it can block the high AC voltage static electricity from being applied to the data line(s) and/or gate line(s) in the display area.

Although the present invention has been explained by the embodiments shown in the drawings and/or described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   at least one signal line disposed in a display area and extending to a non-display area located outside the display area;
   a common line crossing the signal line in the non-display area;
   at least one static electricity preventing element connected between the common line and the signal line in the non-display area; and
   at least one static electricity preventing auxiliary electrode projected towards the signal line from the static electricity preventing element in the non-display area,
   wherein the static electricity preventing element comprises:
   a first transistor including a source electrode and a gate electrode connected to the signal line in the non-display area;
   a second transistor including a gate electrode connected to a drain electrode of the first transistor, and a source electrode connected to the signal line in the non-display area; and
   a third transistor including a gate electrode connected to a drain electrode of the second transistor, a source electrode connected to the drain electrode of the first transistor, and a drain electrode connected to the common line, and
   wherein the static electricity preventing element comprises a connecting electrode connecting the common line and the drain electrode of the third transistor,
   wherein the static electricity preventing auxiliary electrode is projected towards the data line or gate line from the connecting electrode.

* * * * *